INVENTOR.
ROBERT P. FARNSWORTH,
BY Walter J. Adam
ATTORNEY.

United States Patent Office 3,435,233
Patented Mar. 25, 1969

3,435,233
GAIN CONTROL SYSTEM FOR PHOTO-MULTIPLIER SYSTEMS

Robert P. Farnsworth, Los Angeles, Calif., assignor to Hughes Aircraft Company, Culver City, Calif., a corporation of Delaware Filed Mar. 24, 1966, Ser. No. 537,106
Int. Cl. H01j 39/12
U.S. Cl. 250—207 12 Claims

ABSTRACT OF THE DISCLOSURE

This gain control system, utilizing photomultiplier tubes, maintains a constant overall dynode divided voltage but selectively varies the voltage on alternate dynodes. By changing the voltage differential between alternate dynodes or alternate groups of dynodes, the voltage increases and decreases or decreases and increases between adjacent electron paths so that the overall current multiplication is relatively constant. The gain change is provided by electrostatic deflection control rather than by varying the electron multiplication factor so that the sensitivity is many times greater than in prior arrangements. The invention includes DC, AC and time programmed gain control systems.

This invention relates to gain control systems and particularly to highly sensitive gain control circuits for photomultiplier tubes.

In gain control systems such as automatic gain control systems, time programmed gain control systems or gain normalization systems, utilizing photomultiplier tubes, a high degree of sensitivity is desirable for providing gain control in response to a parameter or combination of parameters. Conventional gain control circuits for photomultiplier tubes include a voltage divider with substantial equal voltage differences between adjacent dynodes with the control voltage varying the total voltage across the dynode voltage divider string resulting in changes of the electron multiplication factor of each dynode. This type of control is effective but requires excessive voltage change for a reasonable range of gain control, such as typically requiring a 400 volt change at one end of the voltage divider to provide a total gain change of 20 db (decibels), for example. A photomultiplier gain control circuit that would provide a very large linear gain change with a relatively small control voltage change would provide increased control range to photomultiplier tubes and greatly simplify the voltage sources and the control structure.

It is therefore an object of this invention to provide an improved multiple dynode gain control system for photomultiplier tubes.

It is a further object of this invention to provide a photomultiplier tube gain control system having a high sensitivity, that is, developing a very large change in gain in response to a small change in control voltage.

It is a still further object of this invention to provide an improved photomultiplier tube gain control system having a high degree of linearity of gain versus control voltage.

It is another object of this invention to provide a highly sensitive photomultiplier tube gain control circuit responsive to control pulses.

It is still another object of this invention to provide a highly sensitive photomultiplier tube gain control circuit for developing time programmed gain control and operable with automatic gain control.

The improved photomultiplier tube gain control system in accordance with the principles of the invention maintains a constant overall total dynode divided voltage but selectively varies the voltage on adjacent dynodes. The resultant defocusing of the dynode structure deflects the elecrons and lowers the effective gain of the dynode stages. By changing the voltage differential between alternate dynodes or alternate groups of dynodes, the voltage increases and decreases or decreases and increases between adjacent electron paths so that current multiplication is virtually unchanged. Because the gain change results from the electrostatic deflection control rather than by varying the electron multiplication factor, the sensitivity is many times greater than in prior art arrangements. The principles of the invention are applicable to DC (direct current) control either with a very high sensitivity or a slightly decreased sensitivity with simplified circuit elements, AC (alternating current) gain control and time programmed gain control.

The novel features which are believed to be characteristic of the invention, both as to its organization and method of operation, together with further objects and advantages thereof, will be better understood from the following description considered in connection with the accompanying drawings, in which like characters refer to like parts, and in which.

Figure 1:
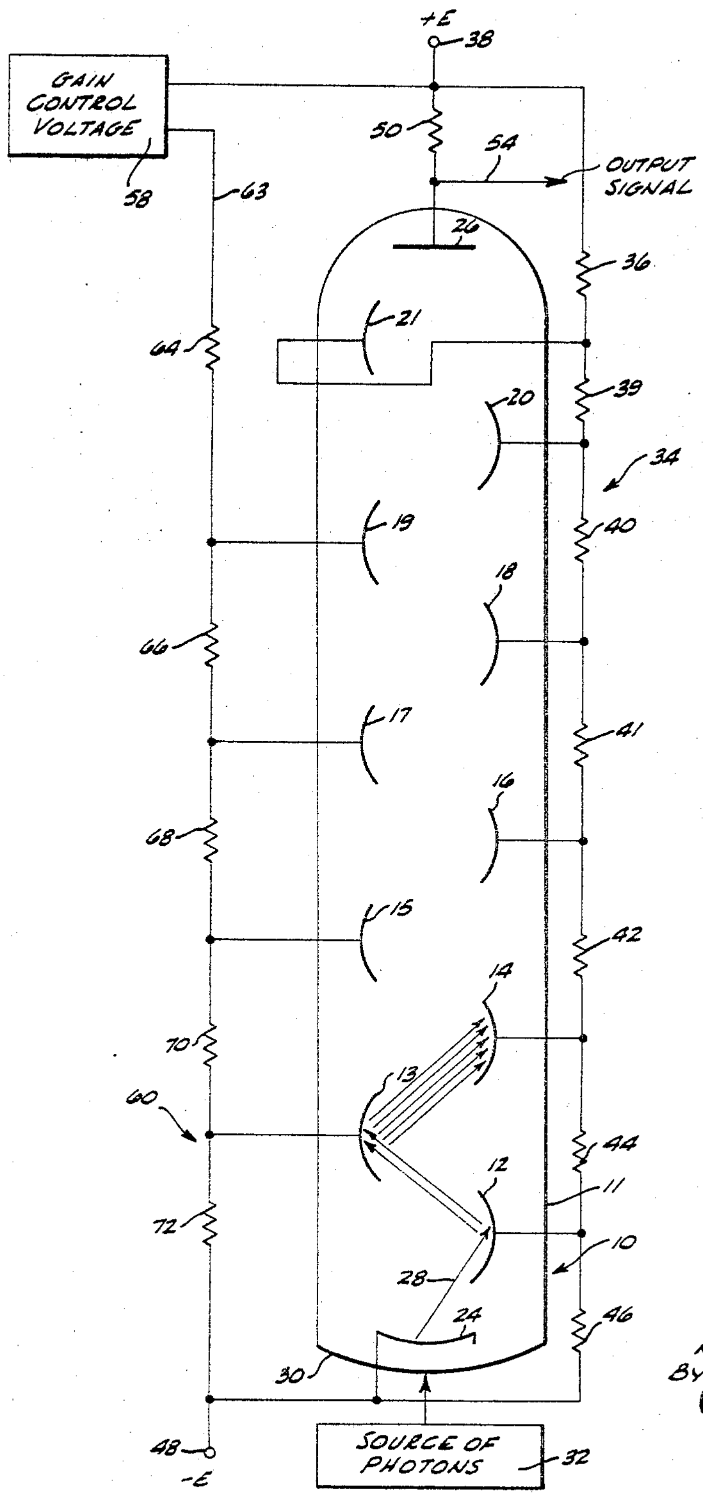
FIG. 1 is a schematic circuit diagram of a multplier tube having gain control of alternate dynode stages in accordance with the principles of the invention.

Referring first to FIG. 1, a photomultiplier tube 10 includes a housing 11 for maintaining a vacuum therein having a shield (not shown) on the outer or inner surface thereof which may be coupled to a suitable source of reference potential (not shown). The tube 10 includes ten dynodes or dynode amplifier stages numbered 12 to 21, a photo cathode 24 or other suitable type of cathode and an anode 26 all mounted within the housing 11. The surfaces of the dynodes 12 to 21 may be arranged so that an electron emitted from the cathode 24 follows a path 28 with additional emitted electrons from one dynode to the next providing an electron multiplication at each dynode such as, for example, emitting 2.5 electrons on the average at each dynode in response to each electron striking the surface thereof. Electrons may be emitted from the cathode 24 in response to photons or any suitable particles received from a source 32 and applied through a surface 30 of the housing 11 to the surface of the cathode. To provide the improved gain control in accordance with the invention, alternate dynodes 12, 14, 16, 18, 20 and 21 are coupled to a voltage divider or series of resistors 34 which includes a resistor 36 coupled between a suitable positive source of potential 38 providing a voltage +E to the dynode 21. A resistor 39 is coupled between the dynodes 21 and 20, a resistor 40 is coupled between the dynodes 20 and 18, a resistor 41 is coupled between the dynodes 18 and 16, a resistor 44 is coupled between the dynodes 14 and 12 and a resistor 46 is coupled between the hynode 12 and a suitable negative source of potential 48 providing a voltage −E. The photo cathode 24 is coupled to the source of potential 48 and the anode 26 is coupled through a resistor 50 to the source of potential 38. An output signal may be derived from the anode 26 through a lead 54.

For providing a gain control, a source of gain control voltage 58 is coupled to the source of potential 38 and to a voltage divider or series of resistors 60 including a resistor 64 coupled between the source 58 and the dynode 19. Resistors 66, 68 and 70 are also coupled between respective dynode pairs 19 and 17, 17 and 15 and 15 and 13. A resistor 72 is coupled between the dynode 13 and the negative source of potential 48. It is to be noted that the first two dynodes 21 and 20 are both coupled to the fixed voltage divider 34 to provide an electrostatic shield so that the voltage changes from the divider 60 do not pass by capacitive coupling to the anode 26. As an illustrative example, the voltages +E and −E may be provided respectively at ground potential and −1600 volts.

In operation, a constant dynode voltage is maintained by the voltage divider 34 but a variable voltage is applied to the lead 63 to change the voltage on the dynodes 13, 15, 17 and 19. For example, lowering the voltage on the lead 63 lowers the voltage on the dynodes 13 and 15 by amounts determined by the value of the divider resistors resulting in an increased potential difference between the dynodes 12 and 13 and a decreased potential difference between the dynodes 13 and 14. This change of voltage defocuses the electrostatic fields to deflect the path 28 of the electrons so that certain electrons miss the anode 26 or previous dynodes providing a decrease in overall electron multiplication. It is to be noted that because the potential difference between adjacent dynodes is alternately lowered and raised, the overall electron muliplication constant is essentially unchanged, the defocusing operation providing the gain control.

Figure 2:
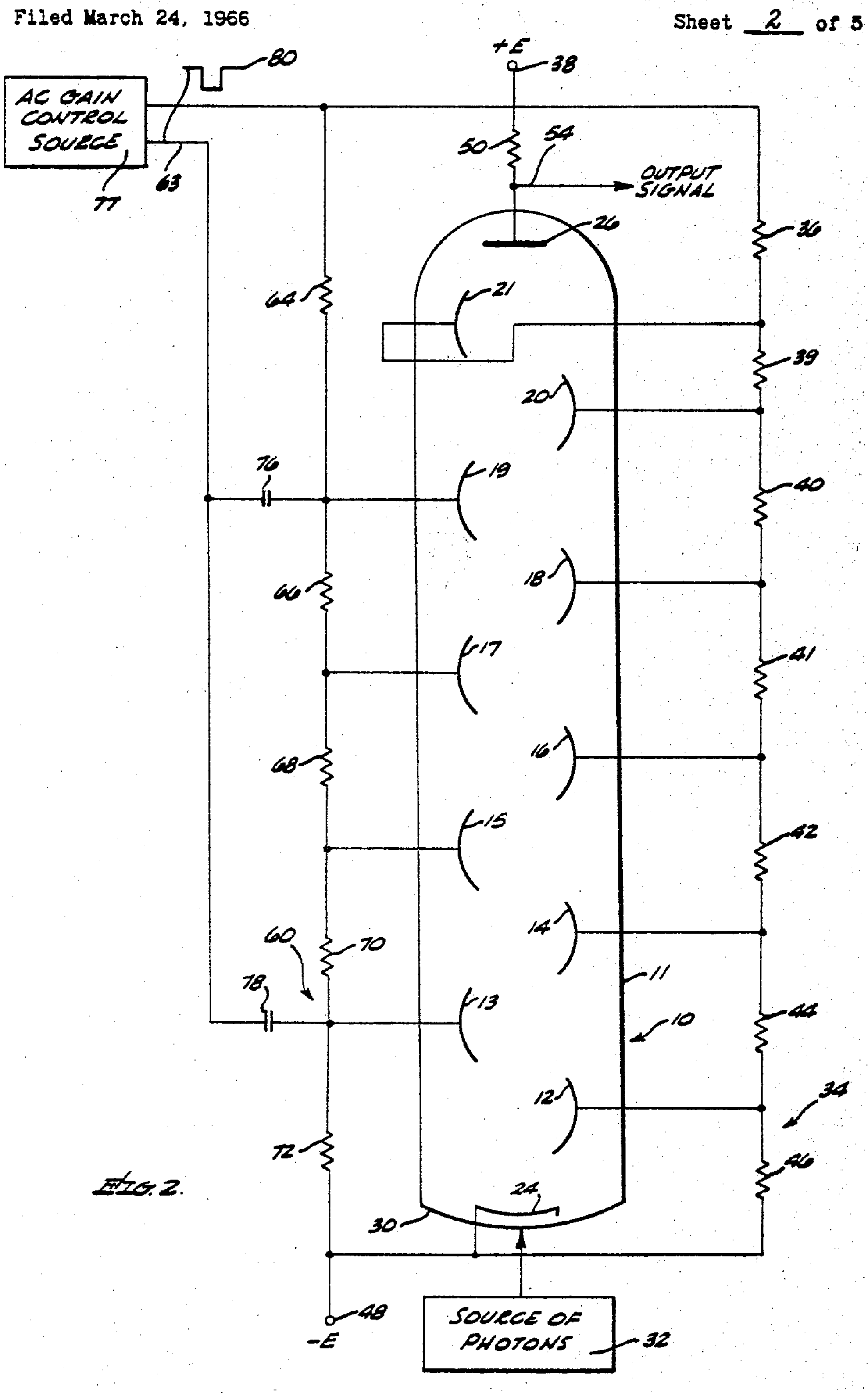
FIG. 2 is a schematic circuit diagram of a photomultiplier tube having AC gain control in accordance with the invention.

Referring now to FIG. 2 for providing AC control of the gain of the tube 10, the lead 63 is coupled through a capacitor 76 to the junction of resistor 64, resistor 66 and dynode 19, and through a capacitor 78 to a point between the resistors 70 and 72. The two amplitudes of the control pulses as shown by a waveform 80 from an AC gain control source 77 determines the relative voltages on the dynodes 19, 17, 15 and 13 and the overall photomultiplier tube gain. Because the control signal of the waveform 80 is applied to both ends of the divider 60, the change in control voltage appears equally on all controlled dynodes to provide a high degree of sensitivity. The circuit of FIG. 2 may operate in response to any desired AC signal such as a multilevel signal or a sine wave to provide either a fixed number of gain levels or continuously changing gain levels. It is to be noted that a change in value of the resistor 64 can be made to shift the operating curve of FIG. 5 along the control voltage axis.

Figure 3:
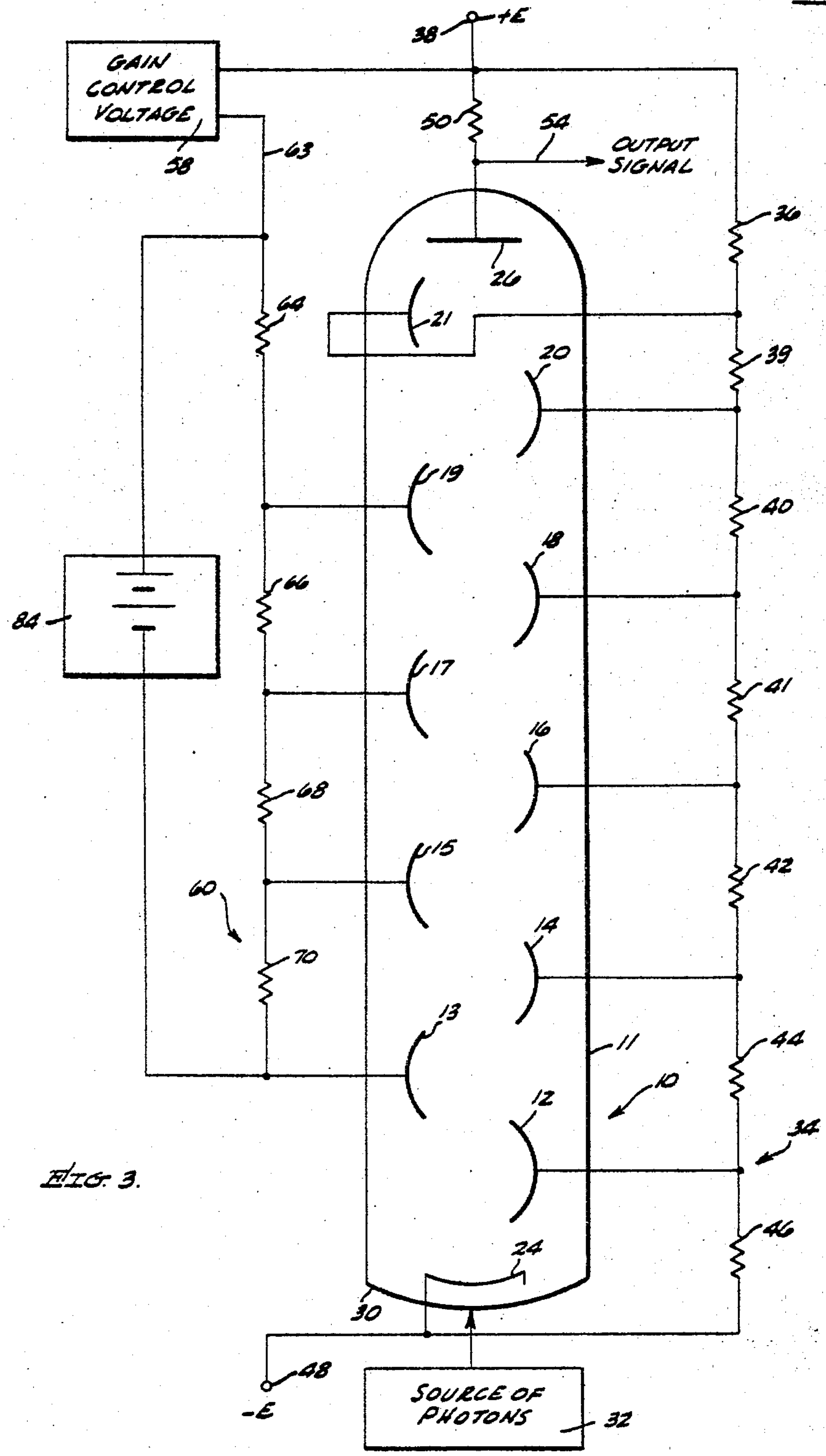
FIG. 3 is a schematic circuit diagram of a gain control circuit in accordance with the invention having highly sensitive DC control of a multiplier tube.

The arrangement of FIG. 3 provides a relatively high sensitivity to a DC control signal by including a floating potential source 84 coupled between the lead 63 and the dynode 13. The source 84 may include a battery 86. The arrangement of FIG. 3 provides a greater voltage change on the dynodes in response to a control voltage than in the circuit of FIG. 1, but requires an additional source of potential. For example, if the voltage is increased on the lead 63, the voltage is also increased an equal amount on each of the dynodes 13, 15, 17 and 19. The resistor 64 may be varied in the circuit of FIG. 3 to shift the operating curve along the control voltage axis of FIG. 5.

Figure 4:
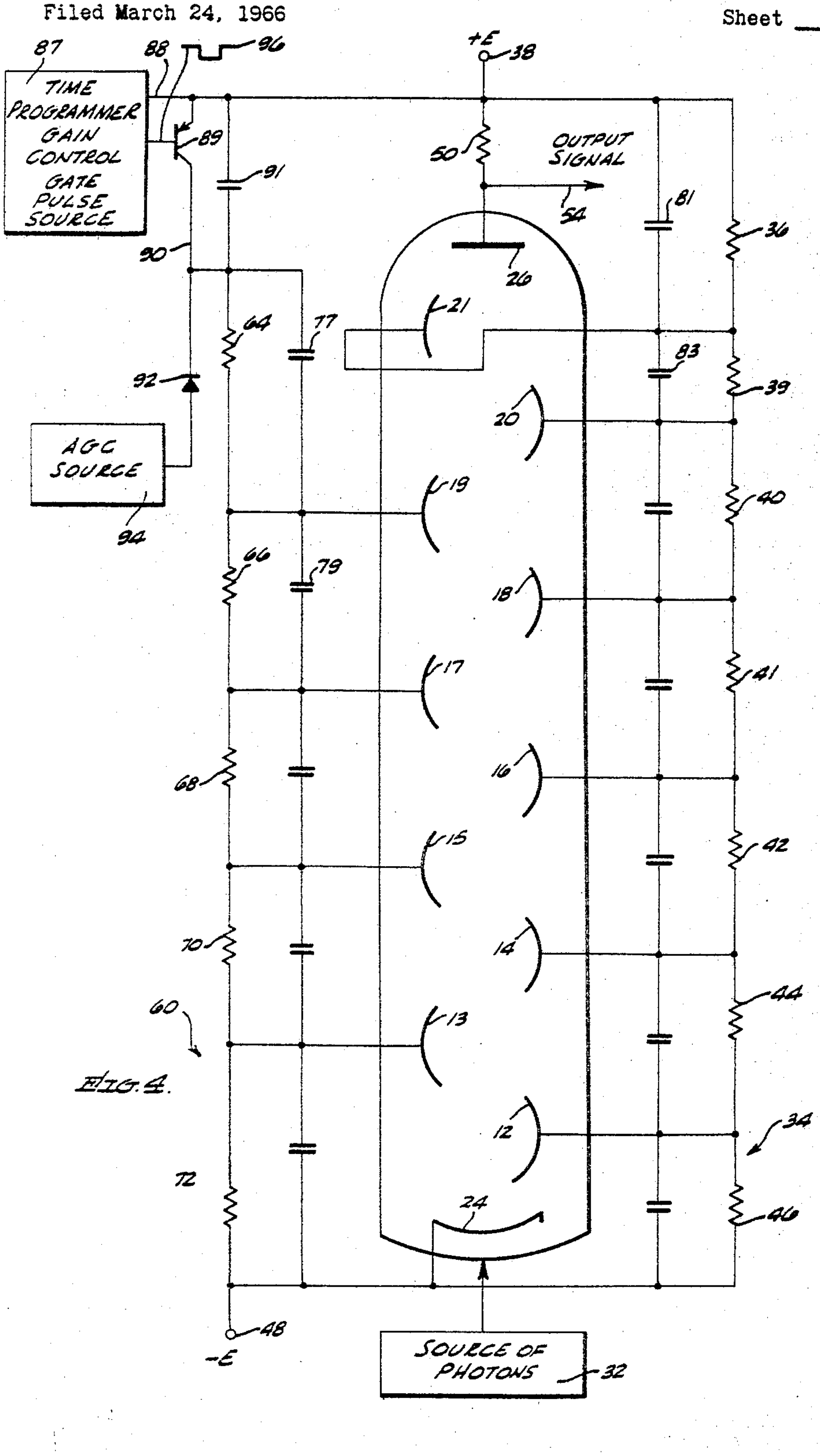
FIG. 4 is a schematic circuit diagram of a photomultiplier tube gain control circuit in accordance with the invention employing automatic gain control and time programmed gain control.

Referring now to FIG. 4, a time programmed gain control circuit in accordance with the principles of the invention includes a lead 88 coupled from a time programmed gain control gate pulse source 87 to the base of a suitable switching device such as a transistor 89 which may be of the pnp type. The emitter of the transistor 89 is coupled to the positive source of potential 38 and the collector is coupled to a lead 90 which in turn is coupled to a point between the resistor 64 and a capacitor 91 which is coupled between the resistor 64 and the source of potential 38. To provide automatic gain control (AGC) a diode 92 has an anode to cathode path coupled between an AGC source 94 and the lead 90. It is to be noted that a fixed voltage may be applied to the circuit from the source 94 within the scope of the invention if AGC is not to be utilized. The time programmed gain pulse of a waveform 96 is applied to the base of the transistor 89 to rapidly discharge the capacitor 91 which lowers the gain of the tube 10 to a minimum design level. At this time the diode 92 is back biased. As determined by the value of the resistor 64 and other resistors of the divider string 60 at the termination of the pulse of the waveform 96, the capacitor 91 charges linearly through the resistors 72, 70, 68, 66 and 64 to develop a desired gain profile. The maximum level of gain may be limited by the clamping action of the AGC voltage applied to the diode 92 which is biased in the forward direction at the end of the gain variation or profile which may be substantially linear by charging the capacitor 91 to only a small percentage of the dynode supply potential 48 before the diode 92 is forward biased. For pulsed operation, the capacitors shown in FIG. 4 such as 77 and 79 for the divider 60 and the capacitors shown such as 81 and 83 for the divider 34 may be utilized to supply peak dynode current when the photons or particles are applied in pulses from the source 32. The capacitors at the divider 60 such as capacitors 77 and 79 may be selected to be a substitute for the capacitor 91 to eliminate capacitor 91 in accordance with the principles of the invention. It is to be noted that the capacitors such as 77, 79, 81 and 83 may also be utilized in the circuits of FIGS. 1, 2 and 3 within the scope of the invention.

Figure 5:
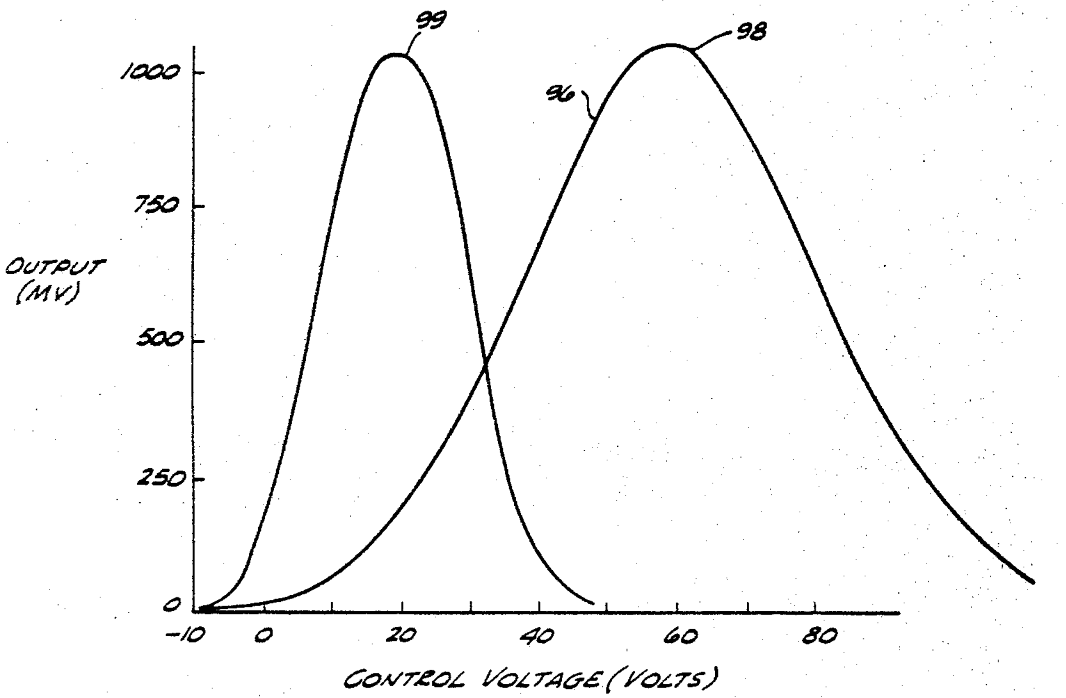
FIG. 5 is a diagram of typical transfer curves of photomultiplier tube output voltage versus control voltage for explaining the operation of the gain control circuits in accordance with the invention.
Figure 6:
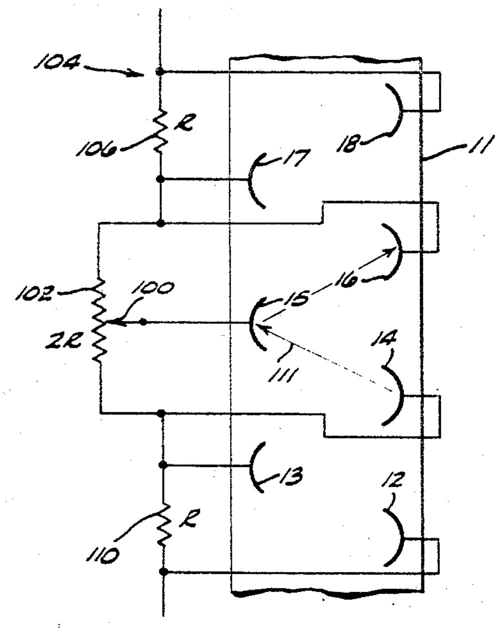
FIG. 6 is a schematic circuit diagram of an arrangement utilized to explain the improved gain effect in accordance with the invention.

Referring now to FIGS. 5 and 6, a transfer curve 96 shows the gain or increase of output voltage from a relatively low level to a peak level 98 followed by a decrease of output voltage to a relatively low level as the control voltage is increased such as may be provided by the circuits of FIGS. 1, 2 and 4. A curve 97 having a peak 99 may be provided by the circuit of FIG. 3 in which equal control voltage changes are applied to all controlled dynodes to provide a high degree of sensitivity. At the peak gain 98 the voltage difference between each adjacent pair of dynodes is equal throughout the photomultiplier tube 10 which condition corresponds to a conventional dynode control arrangement. For explaining the gain control phenomena in accordance with the invention, the circuit of FIG. 6 is connected to the tube 10 with the dynode 15 coupled to a movable tap 100 which in turn is movably connected to a resistor 102 having a value 2R. The other dynodes such as 12, 13, 14, 16, 17 and 18 are coupled to a conventional voltage divider string 104 in turn coupled between the sources of potential 38 and 48 similar to the arrangement of FIG. 1. Each of the resistors such as 106, 108 and 110 of the voltage divider string 104 has a value R, so that when the tap 100 is at the center of the resistor 102, providing equal voltage differences between all adjacent dynodes, the output voltage is measured and found to be at the peak 98. When the tap 100 is moved up on the figure so that the voltage difference is decreased between the dynodes 15 and 16 and increased between the dynodes 15 and 14, the overall gain of the tube decreases. When the tap 100 is moved down from the center position so that the voltage difference increases between the dynodes 15 and 16 and decreases between the dynodes 15 and 14, the overall tube gain decreases. This change of gain with change of voltage difference between adjacent dynodes is believed to provide a defocusing of the electrostatic field surrounding the dynodes so that the electron path is deflected from a path 111 which may be considered to be from center to center of adjacent dynodes. Thus, a path of electrons that may be between the centers of each adjacent dynode is deflected so that certain of the electrons either do not strike the anode 26 or do not strike earlier dynodes and are applied to the anode without the full electron multiplication action or are applied to dynodes closer to the anode. Because of the symmetry of the dynode structures, any change of relative voltage difference between adjacent paths provides a deflection to lower the gain. As shown by the curve 96, a substantial portion of the characteristic is linear. Operation may be performed on either side of the curve 96 depending upon the desired range of control voltage that is to be utilized. The operation of the circuit of FIG. 3 to provide the curve 97 is similar to that discussed relative to the curve 96.

In the circuit of FIG. 1, a relatively high degree of gain control is provided with a minimum of control circuitry. In the circuit of FIG. 3, a very high sensitivity is provided except requiring a suitable floating power source. In the circuit of FIG. 2, AC control is provided and in the circuit of FIG. 4 a programmed gain is provided either with or without an AGC signal. It is to be noted that the circuit of FIG. 2 may also be utilized to provide programmed gain control in accordance with the invention. For a typical photomultiplier tube utilizing the conventional voltage divider string, a 400 volt change of control voltage is required to obtain a gain change of 20 db. It has been found that with the circuit of FIG. 1 in accordance with the invention, a change in control voltage of 60 volts DC with the typical tube will cause a gain change greater than 40 db using the direct coupling. In the circuit of FIG. 3 utilizing two power supplies, 20 volts control voltage change will provide 40 db change in gain with the same photomultiplier tube. In the circuit utilizing AC coupling of FIG. 2, a change of 20 volts AC will cause a gain change of approximately 100 (40 db). It is to be understood that in the circuit of FIG. 4, either the DC coupling, DC coupling with an extra power supply or AC coupling may be utilized in accordance with the principles of the invention and with the typical photomultiplier tube discussed above, would provide a higher degree of gain sensitivity than discussed above for that voltage change on the capacitor 91. For example, in the circuit configuration shown in FIG. 4, and utilizing a typical photomultiplier tube, a change of 60 volts on the capacitor 91 would provide a programmed gain change greater than 40 db. It is to be understood that the response to the control voltage varies with different photomultiplier tubes 10 and the principles of the invention are not to be limited to any particular parameters or range of voltages or gain changes. Also, it is to be noted that the principles of the invention are not to be limited to any particular photomultiplier tube but are applicable to all types of multiplier tubes in which defocusing causes electrons to be deflected from their normal paths. Depending upon the spacing relation of the dynodes, varying the voltage on alternate groups of dynodes is also within the scope of this invention.

Thus there has been described a photomultiplier tube gain control system that has a high degree of sensitivity. By maintaining a constant divider voltage at selected ones of the dynodes and controlling the voltage at selected other dynodes generally intermediate to the dynodes having constant voltages, the electron path is varied to provide substantially linear gain control. It is noted that the gain change can be in phase or 180 degrees shifted in phase with the control voltage by selecting the point of operation relative to the point of maximum gain. The principles of the invention include operation with either AC, DC or time varying control voltages.

What is claimed is:

1. A system for providing substantially linear gain control to a photomultiplier tube having an anode, a cathode and a plurality of dynode stages comprising first voltage divider means coupled to a first group of dynode stages for applying substantially constant voltages to said dynode stages, second voltage divider means coupled to a second group of dynode stages alternately positioned between the dynode stages of said first group, and a source of variable control signals coupled to said second voltage divider means for varying substantially linearly the voltages applied to the dynode stages of said second group to provide a substantially linear change of gain between the cathode and anode.

2. A gain control system for a photomultiplier tube having an anode, a cathode and a plurality of dynodes positioned in a sequence between the cathode and anode comprising first voltage divider means coupled to a first group of said dynodes for applying substantially constant voltages thereto, second voltage divider means coupled to a second group of said dynodes being at alternate positions in said sequence, a source of substantially constant voltage coupled to said first voltage divider means, and a source of variable control voltage coupled to said second voltage divider means.

3. The gain control system of claim 2 in which said cathode is a photo cathode and further including a source for applying photons to said cathode and output means coupled to said anode.

4. The gain control system of claim 2 in which first and second capacitive means are coupled between said source of control voltage and first and second points of said second voltage divider means and said source of control voltage applies an AC signal through said first and second capacitor means to said second voltage divider means.

5. The gain control system of claim 2 in which a floating power source is coupled across said second voltage divider means for combining a voltage with the voltage applied from said source of control voltage.

6. The gain control system of claim 2 in which said source of control voltage is a source of pulses and including an automatic gain control source, a source of potential, capacitor means coupled between said second voltage divider means and said source of constant voltage, switching means coupled to said pulse source and from said source of potential to a point between said capacitor means and said second voltage divider means and diode means coupled between said automatic gain control source to the point between said capacitor means and said second voltage dividing means.

7. A gain control system for a photomultiplier tube having an anode, a cathode and a plurality of dynodes sequentially positioned between the cathode and anode for sequentially providing electron multiplication of electrons emitted from the cathode comprising means for applying particles to said cathode, means for developing an output signal at said anode, first and second sources of reference potential respectively coupled to said anode and said cathode, a first voltage divider coupled between said first and second sources of potential and having points coupled to a first group of said dynodes, a second voltage divider having first and second ends with the first end coupled to said second source of potential and having points coupled to a second group of said dynodes each dynode being alternately positioned with the dynodes of said first group along said sequence, and a source of variable gain control voltage coupled to the second end of said second voltage divider for providing a substantially linear gain control between said output signal and said gain control voltage.

8. A gain control system for a photomultiplier tube having an anode, a cathode and a plurality of dynodes sequentially positioned between the cathode and anode for sequentially providing electron multiplication of electrons emitted from the cathode comprising first and second sources of potential respectively coupled to said anode and said cathode, a first voltage divider coupled between said first and second sources of potential and having a plurality of points each coupled to a different dynode of a first group of said dynodes, a second voltage divider having first and second ends with the second end coupled to said second source of potential and having a plurality of points each coupled to a different dynode of a second group of said dynodes each dynode being alternate to the dynodes of said first group along said sequence, a source of control pulses, a source of gain control voltage, a transistor having first and second electrodes respectively coupled between said first source of potential and the first end of said voltage divider means and having a base coupled to said source of control pulses, a capacitor coupled between said first source of potential and the first end of said second voltage divider, a diode coupled between said source of gain control voltage and the first end of said second voltage divider, whereby in response to a control pulse said transistor is biased into conduction to discharge said capacitor and at the termination of said pulse, said capacitor charges to vary the gain of said photomultiplier tube until said diode is biased into conduction to establish the gain of said tube.

9. A gain control system for a photomultiplier tube having an anode, a cathode and a plurality of dynodes sequentially positioned between the cathode and the anode for sequentially providing electron multiplication of electrons emitted from the cathode comprising means for applying particles to said cathode, means for developing an output signal at said anode, first and second sources of potential respectively coupled to said anode and said cathode, a first voltage divider coupled between said first and second sources of potential and having points coupled to a first group of said dynodes, a second voltage divider having first and second ends and having points coupled to a second group of said dynodes each dynode being alternately positioned with the dynodes of said first group along said sequence, a floating power source coupled between the first and second ends of said second voltage divider, and a source of gain control voltage couled to the first end of said second voltage divider for providing substantially equal voltage changes to each of said second group of dynodes to develop linear gain control between said output signal and said gain control voltage.

10. A gain control system for a multiplier tube having an anode, a cathode and a plurality of dynode stages comprising first voltage divider means coupled to a first group of dynode stages for applying substantially constant voltages thereto, second voltage divider means coupled to a second group of said dynode stages being alternately positioned between the dynode stages of said first group, said second voltage divider means including resistance means coupled between the dynode stages of said second group, a plurality of capacitive means with one coupled across each of said resistance means, and a source of variable control signals coupled to said second voltage divider means.

11. A gain control system for a multiplier tube having an anode, a cathode and a plurality of dynode stages positioned in a sequence between the cathode and anode comprising first voltage divider means coupled to a first group of dynode stages for applying substantially constant voltages thereto, said first voltage divider means including capacitive means coupled to the dynode stages of said first group, second voltage divider means coupled to a second group of said dynode stages being at alternate positions in said sequence, said second voltage divider means including capacitive means coupled to the dynode stages of said second group, and a source of variable control signals coupled to said second voltage divider means.

12. A gain control system for a multiplier tube having an anode, a cathode and a plurality of dynode stages positioned in a sequence comprising first voltage divider means coupled to a first group of dynode stages for applying substantially constant voltages thereto, said first voltage divider means including a plurality of resistance means and capacitance means with a different resistance means and capacitance means coupled in parallel between adjacent dynode stages of said first group and to the end dynode stages of said first group, second voltage divider means coupled to a second group of said dynode stages being at alternate positions in said sequence, said second voltage divider means including a plurality of resistance means and capacitance means with a different resistance means and capacitance means coupled in parallel between adjacent stages of said second group and to the end dynode stages of said second group, a source of pulses, a source of potential, capacitance means coupled between the second voltage divider means and the source of constant potential, switching means coupled to said pulse source and from said source of potential to a point between said capacitor means and said second voltage divider means, and a source of gain control signals coupled to the point between said capacitor means and said second voltage divider means.

References Cited

UNITED STATES PATENTS

| | | | |
|---|---|---|---|
| 2,951,941 | 9/1960 | Brannon | 250—207 X |
| 3,243,588 | 3/1966 | Scherbatskoy | 250—207 X |
| 3,349,273 | 10/1967 | Gregg | 313—105 X |

JAMES W. LAWRENCE, *Primary Examiner.*

C. R. CAMPBELL, *Assistant Examiner.*

U.S. Cl. X.R.

313—105